(12) United States Patent
Park et al.

(10) Patent No.: US 7,878,235 B2
(45) Date of Patent: Feb. 1, 2011

(54) REAR AIR CONDITIONER FOR VEHICLE

(75) Inventors: Min-Woo Park, Daejeon-si (KR);
Hyung-Joo Kim, Daejeon-si (KR)

(73) Assignee: Halla Climate Control Corp.,
Daejeon-si (KR)

( * ) Notice: Subject to any disclaimer, the term of this patent is extended or adjusted under 35 U.S.C. 154(b) by 1338 days.

(21) Appl. No.: 11/277,670

(22) Filed: Mar. 28, 2006

(65) Prior Publication Data

US 2006/0223431 A1   Oct. 5, 2006

(30) Foreign Application Priority Data

Mar. 29, 2005   (KR) .................... 10-2005-0025994

(51) Int. Cl.
*B60H 1/00* (2006.01)

(52) U.S. Cl. .................. 165/204; 165/202; 165/42; 454/121; 454/126; 62/244

(58) Field of Classification Search .............. 165/41, 165/42, 43, 44, 202, 203, 204; 454/121, 454/126, 156; 62/244; 237/12.3 A, 12.3 B
See application file for complete search history.

(56) References Cited

U.S. PATENT DOCUMENTS

| | | | | |
|---|---|---|---|---|
| 4,406,214 A | * | 9/1983 | Sakurai ...................... 454/126 |
| 4,852,638 A | * | 8/1989 | Hildebrand et al. ........... 165/42 |
| 5,042,566 A | * | 8/1991 | Hildebrand .................. 165/42 |
| 5,106,018 A | * | 4/1992 | Loup ..................... 237/12.3 B |
| 5,173,078 A | * | 12/1992 | Robin et al. ................ 454/126 |
| 5,476,418 A | * | 12/1995 | Loup .......................... 454/121 |
| 5,601,142 A | * | 2/1997 | Hildebrand et al. ........... 165/42 |
| 5,884,689 A | * | 3/1999 | Takechi et al. ................ 165/43 |
| 5,960,859 A | * | 10/1999 | Sakurai ....................... 165/43 |
| 5,983,987 A | * | 11/1999 | Weindorf ..................... 165/42 |
| 5,988,263 A | * | 11/1999 | Schwarz ...................... 165/42 |
| 6,116,329 A | * | 9/2000 | Arold .......................... 165/43 |
| 6,475,077 B2 | * | 11/2002 | Arold ......................... 454/156 |
| 6,520,850 B1 | * | 2/2003 | Buckman et al. ............ 454/121 |
| 6,588,496 B2 | * | 7/2003 | Nakagawa et al. ............ 165/42 |
| 6,668,909 B2 | * | 12/2003 | Vincent ....................... 165/42 |
| 6,772,833 B2 | * | 8/2004 | Auer et al. .................. 165/203 |

(Continued)

FOREIGN PATENT DOCUMENTS

EP   1273465   6/2002

(Continued)

*Primary Examiner*—Ljiljana (Lil) V Ciric
(74) *Attorney, Agent, or Firm*—Lowe Hauptman Ham & Berner LLP (57) ABSTRACT

A vehicle rear air conditioner includes an air conditioning case connected with a blower and having a face vent, a floor vent and a vent door for controlling opening and closing of the vents. An evaporator and a heater core are embedded in the air conditioning case and a temperature control door controls opening and closing of a cold and a hot air passageway. The rear air conditioner includes a passageway member in order to discharge part of air flowing through the cold air passageway or the hot air passageway toward one of the vents. The passageway member has an inlet for inducing the part of air and an outlet for discharging the part of air and the vent door includes at least one interference preventing part.

6 Claims, 6 Drawing Sheets

U.S. PATENT DOCUMENTS

| | | | |
|---|---|---|---|
| 6,925,825 B2 * | 8/2005 | Nakagawa et al. | 62/244 |
| 7,281,574 B2 * | 10/2007 | Shibata et al. | 165/203 |
| 7,563,159 B2 * | 7/2009 | Newman et al. | 454/156 |
| 2003/0019233 A1 * | 1/2003 | Nakagawa et al. | 62/244 |
| 2003/0042011 A1 * | 3/2003 | Vincent | 165/203 |
| 2003/0045224 A1 * | 3/2003 | Vincent | 454/156 |

FOREIGN PATENT DOCUMENTS

| | | |
|---|---|---|
| EP | 1574369 | 9/2005 |
| JP | 2000-283576 | 10/2000 |
| JP | 11-348533 | 11/2006 |

* cited by examiner

Fig. 1

Prior Art

REAR AIR CONDITIONER FOR VEHICLE

RELATED APPLICATIONS

The present application is based on, and claims priority from, Korean Application Number 10-2005-0025994, filed Mar. 29, 2005, the disclosure of which is hereby incorporated by reference herein in its entirety.

BACKGROUND OF THE INVENTION

1. Field of the Invention

The present invention relates to a rear air conditioner for a vehicle, and more particularly, to a rear air conditioner for a vehicle, which can prevent a decrease of air volume and improve mixing of cold air and hot air.

2. Background Art

In general, a rear air conditioner for a vehicle is applied to vehicles of a large capacity, Recreational Vehicles (RVs), or Sports Utility Vehicles (SUVs) as large as only a front air conditioner cannot agreeably cool or heat the inside of the vehicle. The rear air conditioner is installed in a sealed space of the rear of the vehicle in link with the front air conditioner, and so, constitutes a dual air conditioner together with the front air conditioner.

Such rear air conditioner is partitioned into two kinds: one having just an evaporator used for cooling the indoor; and the other having an evaporator and a heater core for cooling and heating the indoor. Furthermore, in the latter, the rear air conditioner is partitioned into a non air mixing type air conditioner and an air mixing type air conditioner.

In the non air mixing type air conditioner, an air discharge mode will be described as follows. Cold air is discharged only through a face vent when a cooling mode is operated, but hot air is discharged only through a floor vent when a heating mode is operated. That is, cold air and hot air are not discharged in a mixed state.

Moreover, the air mixing type air conditioner further includes a temperature control door for controlling opening and closing of a cold air passageway and a hot air passageway is disposed between the evaporator and the heater core. Now, an air discharge mode will be described as follows. According to control of the temperature control door, cold air and hot air are mixed with each other at the rear of the cold air passageway and the hot air passageway, and then, the mixed air is discharged to the inside of the vehicle through the opened vent or cold air or hot air is discharged to the inside of the vehicle through the vent according to opening an closing of the cold air passageway and the hot air passageway. That is, the air mixing type air conditioner can be operated in a bi-level mode.

Figure 1:
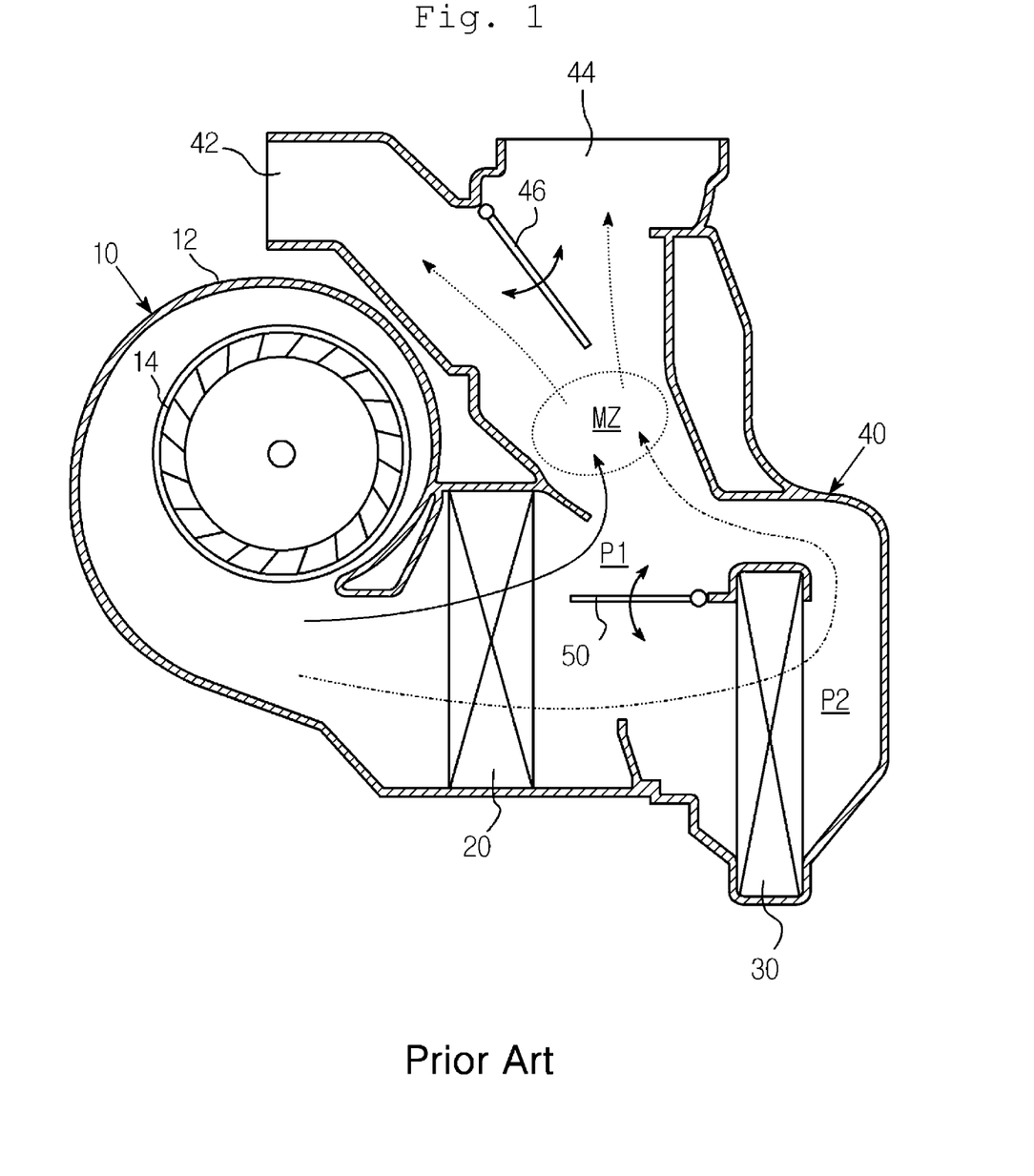
FIG. 1 is a sectional view showing an example of a conventional rear air conditioner for a vehicle.

FIG. 1 shows an example of the air mixing type rear air conditioner. The air mixing type rear air conditioner includes: a blower 10 having a scroll case 12 and a centrifugal fan 14 rotatably mounted inside the scroll case 12; an air conditioning case 40 connected with the blower 10 and having a face vent 42 and a floor vent 44 formed at an outlet thereof, and a vent door 46 for controlling opening and closing of the face vent 42 and the floor vent 44; an evaporator 20 and a heater core 30 embedded in the air conditioning case 40; and a temperature control door 50 for controlling opening and closing of a cold air passageway (P1) and a hot air passageway (P2) of the air conditioning case 40.

When the centrifugal fan 14 is rotated by a blast motor (not shown), air is inhaled in an axial direction of the centrifugal fan 14 through an air inlet (not shown) of the blower 10, and then, discharged in a radius direction of the centrifugal fan 14 and induced into the air conditioning case 40. The air induced into the air conditioning case 40 passes through the evaporator 20, and then, flows toward a mixing zone (MZ) of an air outlet of the air conditioning case 40 through the cold air passageway (P1) or the hot air passageway (P2) opened according to opening and closing by the temperature control door 50. When the air passes through the hot air passageway (P2), the air is heated by the heater core 30, and so, changed into hot air.

Therefore, as shown in FIG. 1, when the temperature control door 50 is turned to a neutral zone in order to open both of the cold air passageway (P1) and the hot air passageway (P2), cold air flows to the mixing zone (MZ) through the cold air passageway (P1), and hot air flows to the mixing zone (MZ) through the hot air passageway (P2). After that, cold air and hot air are mixed with each other in the mixing zone (MZ), and then, the mixed air is discharged to the inside of the vehicle through the opened vent.

However, in the conventional air mixing type rear air conditioner for vehicle, a space for mixing air in the mixing zone (MZ) must be secured sufficiently. But, the conventional air mixing type rear air conditioner has a problem in that it is difficult to secure the space larger than that of the non air mixing type rear air conditioner due to a special limitation of the vehicle and to sufficiently secure the mixing zone since the inside layout of the vehicle is restricted. Therefore, in view of the recent trend of compact-sized rear air conditioners, it is also difficult to make the rear air conditioner compact due to the special problem of the mixing zone. Additionally, the floor vent 44 causes a problem in air mixing since it is mounted near to the hot air passageway (P2), and so, temperature of the air discharged to the floor vent 44 is excessively higher than temperature of the air discharged to the face vent 42. On the contrary, if temperature of the air discharged to the face vent 42 is higher than temperature of the air discharged to the floor vent 44, passengers may feel unpleasantness. Furthermore, according to kinds of vehicles and the internal shapes of the air conditioning case 40, the conventional rear air conditioner may cause lots of trials and errors in keeping temperature of the air discharged to the face vent 42 and the floor vent 44 in a predetermined level.

Therefore, it may be considered to reduce a size of the vent door 46 to sufficiently secure the space of the mixing zone (MZ) for achieving good mixing of hot air and cold air. However, in this case, air volume and noise reduction efficiency are reduced due to air resistance since a sectional area of the passageways of the face vent 42 and the floor vent 44.

SUMMARY OF THE INVENTION

Accordingly, the present invention has been made to solve the above problems occurring in the prior arts, and it is an object of the present invention to provide a rear air conditioner for a vehicle, which can prevent a decrease of air volume and improve mixing of cold air and hot air.

To accomplish the above objects, according to the present invention, there is provided a rear air conditioner for a vehicle, which includes an air conditioning case connected with a blower and having a face vent and a floor vent formed at an outlet thereof, and a vent door for controlling opening and closing of the face vent and the floor vent; an evaporator and a heater core embedded in the air conditioning case; and a temperature control door for controlling opening and closing of a cold air passageway and a hot air passageway of the air conditioning case, comprising at least one bypass passageway formed in a rotating area of the vent door in order to bypass a part of air, which flows through the cold air passageway or the hot air passageway, toward one of the vents.

According to the present invention, the bypass passageway includes a passageway member having an inlet for inducing a part of the air flowing through the cold air passageway or the hot air passageway into the bypass passageway and an outlet for discharging the induced air toward the vents.

It is preferable that the inlet of the passageway member is formed near to the cold air passageway, and the outlet is formed near to the floor vent.

Furthermore, it is preferable that the vent door includes interference preventing parts formed in correspondence with the number of the passageway members in such a way as to allow the vent door to slidably rotate along the outer periphery of the passageway member, the passageway member inserted into the interference preventing part.

Moreover, it is preferable that the passageway member has the same curvature as a rotational trace of the vent door.

Additionally, the passageway member can be arranged at a periphery of the vent door.

Moreover, it is preferable that the bypass passageway fluidically intercommunicates an area of the face vent and an area of the floor vent in such a way as to bypass the air of one area to the other area.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 2:
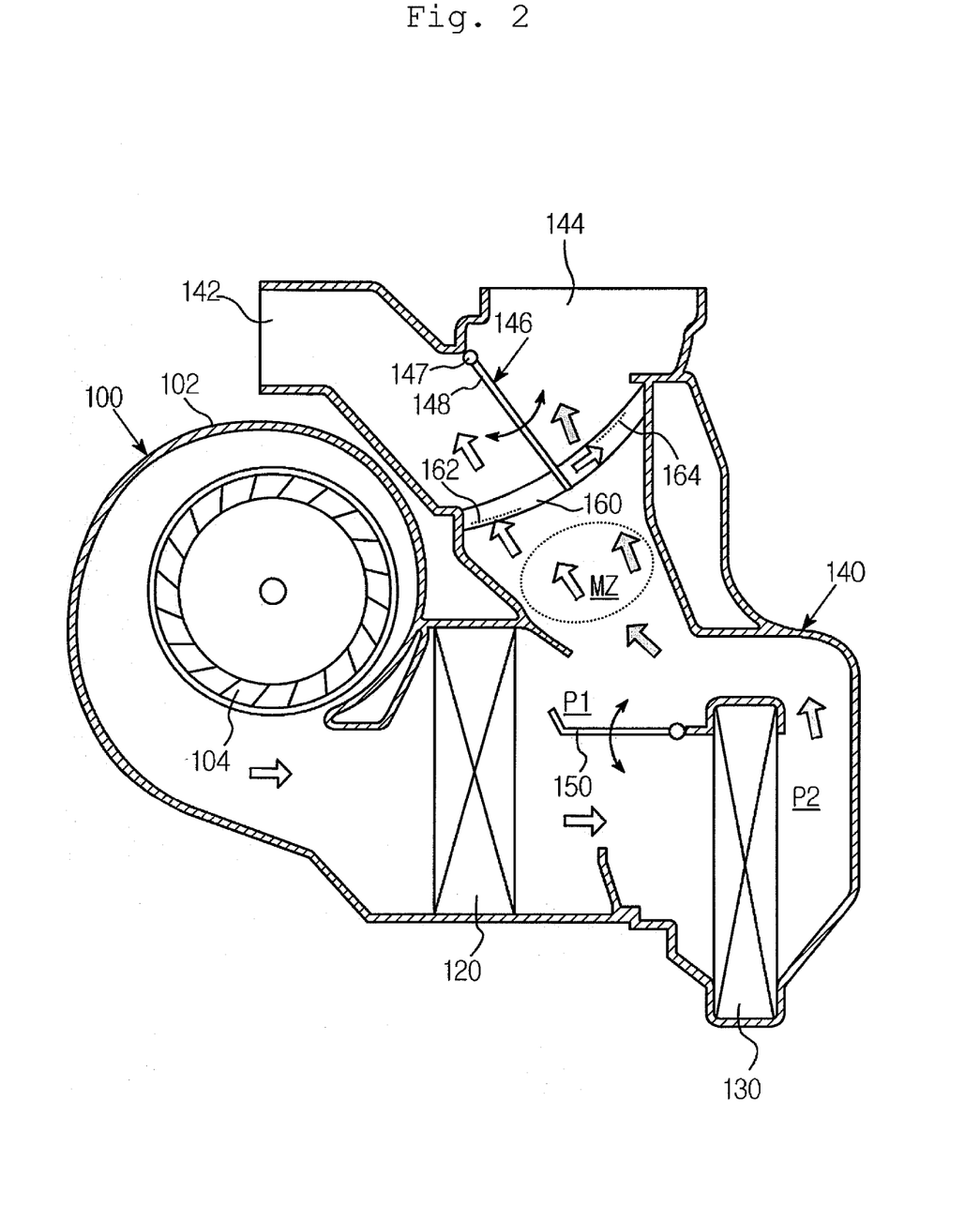
FIG. 2 is a sectional view of a rear air conditioner for a vehicle according to the present invention.

FIG. 2 shows a rear air conditioner of a vehicle according to the present invention. The rear air conditioner includes a blower 100, an air conditioning case 140 connected to the blower 100, an evaporator 120 and a heater core 130 embedded in the air conditioning case 140, and a temperature control door 150 for controlling opening and closing of a cold air passageway (P1) and a hot air passageway (P2) of the air conditioning case 140.

The blower 100 includes a scroll case 102, a centrifugal fan 104 rotatably embedded in the scroll case 102, and a motor (not shown) for rotating the centrifugal fan 104. Therefore, air can be flown to the air conditioning case 140 by rotation of the centrifugal fan 104.

A face vent 142 and a floor vent 144 are formed on an outlet of the air conditioning case 140 in order, and a vent door 146 controls opening and closing of the vents 142 and 144.

Figure 3:
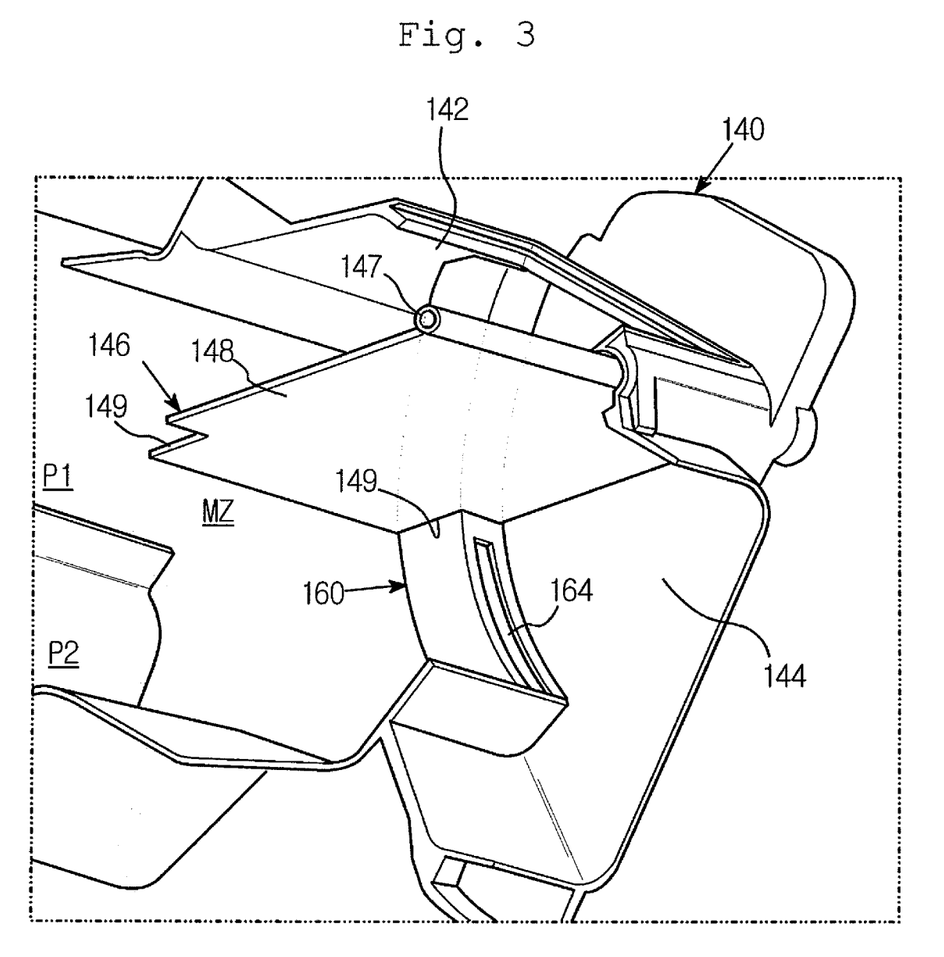
FIG. 3 is a partial perspective view showing the internal configuration of the rear air conditioner for the vehicle according to the present invention.

As shown in FIGS. 2 and 3, the vent door 146 includes a door shaft 147 rotatably supported on the air conditioning case 140, and a door plate 148 connected to the door shaft 147, and mounted between the face vent 142 and the floor vent 144, so that the opening and closing of the face vent 142 and the floor vent 144 can be controlled by just one vent door 146. Furthermore, when the vent door 146 turns to a neutral position as shown in FIG. 2, the face vent 142 and the floor vent 144 are opened at the same time.

The evaporator 120 is mounted on an inlet of the air conditioning case 140, and the heater core 130 is mounted on the hot air passageway (P2). Moreover, a space formed between the cold/hot passageways (P1 and P2) and a rotating area of the vent door 146 serves as a mixing zone (MZ). Therefore, after air blowing by the blower 100 passes through the evaporator 120, the air flows to the mixing zone (MZ) through the cold air passageway (P1) and the hot air passageway (P2) opened by the temperature control door 150, and then, discharged to the inside of the vehicle through the opened vent of the vents 142 and 144.

According to the present invention, as shown in FIGS. 2 and 3, at least one bypass passageway is formed in the rotating area of the vent door 146 in order to bypass a part of the air, which flows to the mixing zone (MZ) through the cold air passageway (P1) or the hot air passageway (P2), toward one of the vents 142 and 144.

According to the present invention, the bypass passageway includes a passageway member 160 having an inlet 162 for inducing a part of the air flowing through the cold air passageway (P1) or the hot air passageway (P2) into the bypass passageway and an outlet 164 for discharging the induced air toward the vents 142 and 144.

Figure 4:
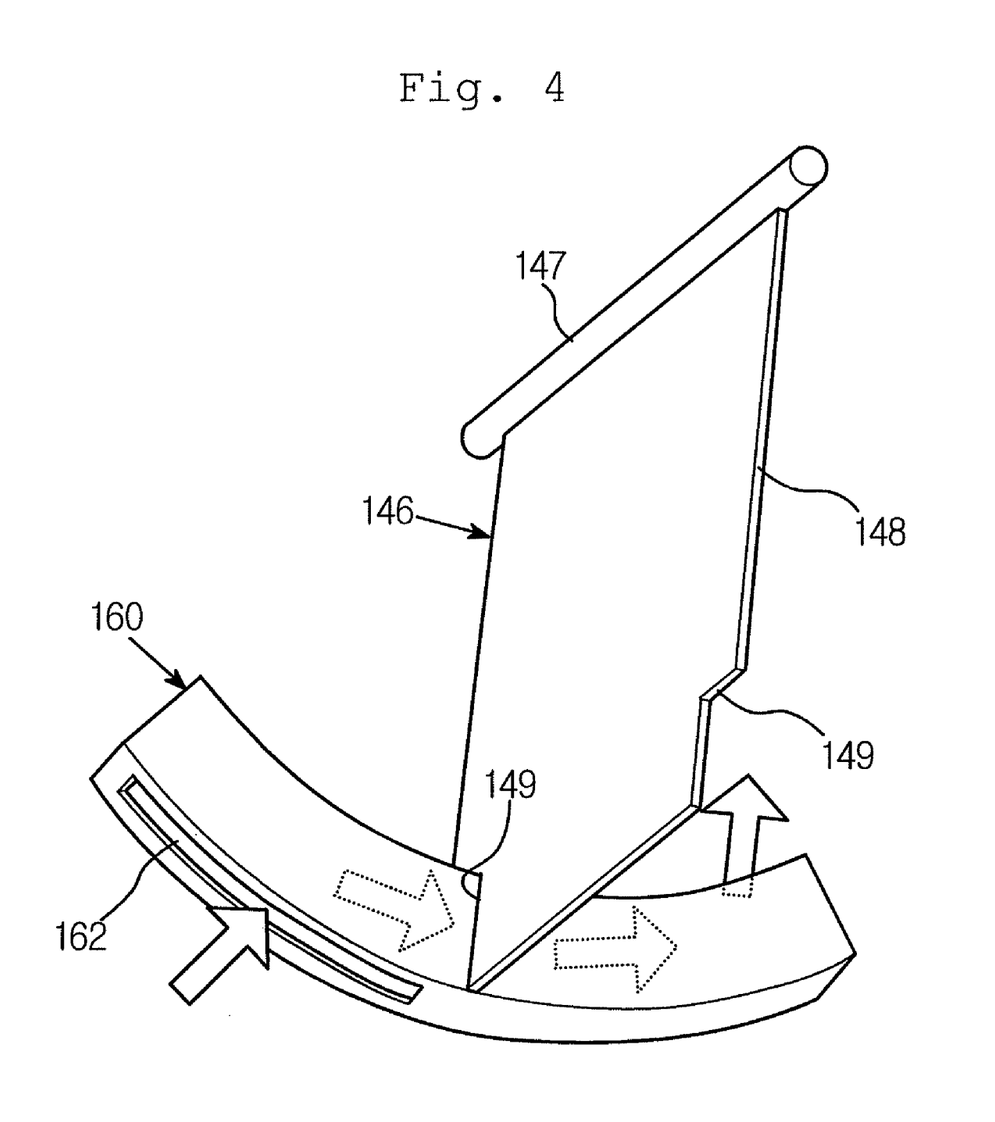
FIG. 4 is a perspective view showing a relation between a door and a bypass passageway of the rear air conditioner according to the present invention.

It is preferable that the inlet 162 of the passageway member 160 is formed near to the cold air passageway (P1), and the outlet 164 is formed near to the floor vent 144. That is, as shown in FIGS. 2 to 4, the inlet 162 of the passageway member 160 is formed at the lower portion of the passageway member 160 near to the hot air passageway (P2), and the outlet 164 is formed at the upper portion of the passageway member 160 near to the face vent 142.

Moreover, it is preferable that the vent door 146 includes interference preventing parts 149 formed in correspondence with the number of the passageway members 160 in such a way as to allow the vent door to slidably rotate along the outer periphery of the passageway member 160. In this case, the passageway member is inserted into the interference preventing part 149, and has the same curvature as a rotational trace of the vent door 146.

Figure 6:
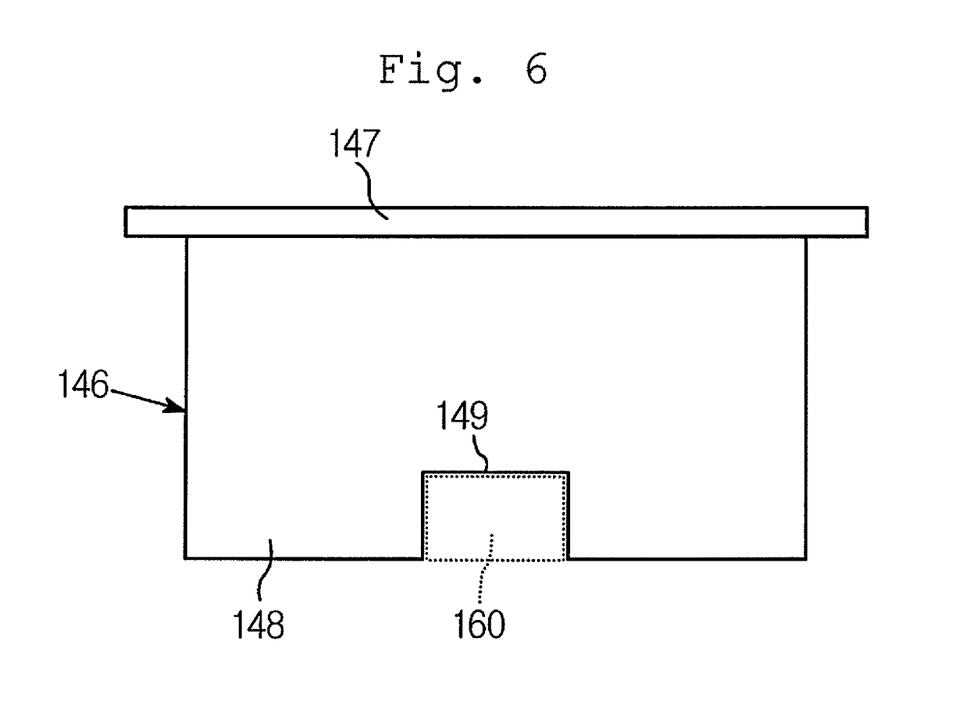
FIG. 6 is a front view showing a second preferred embodiment of the door and the bypass passageway of the rear air conditioner according to the present invention.

For example, if one bypass passageway is applied, as shown in FIG. 6, it is preferable that the groove-shaped interference preventing part 149 is formed at the center of a free end of the vent door 146, and the passageway member 160 is mounted in a rotating area of the interference preventing part 149. Therefore, when the vent door 146 is rotated, the edge of the interference preventing part 149 is slidably rotate along the outer periphery of the passageway member 160.

Furthermore, if two bypass passageways are applied, the interference preventing parts 149 are respectively arranged on peripheries of the vent door 146.

Figure 7:
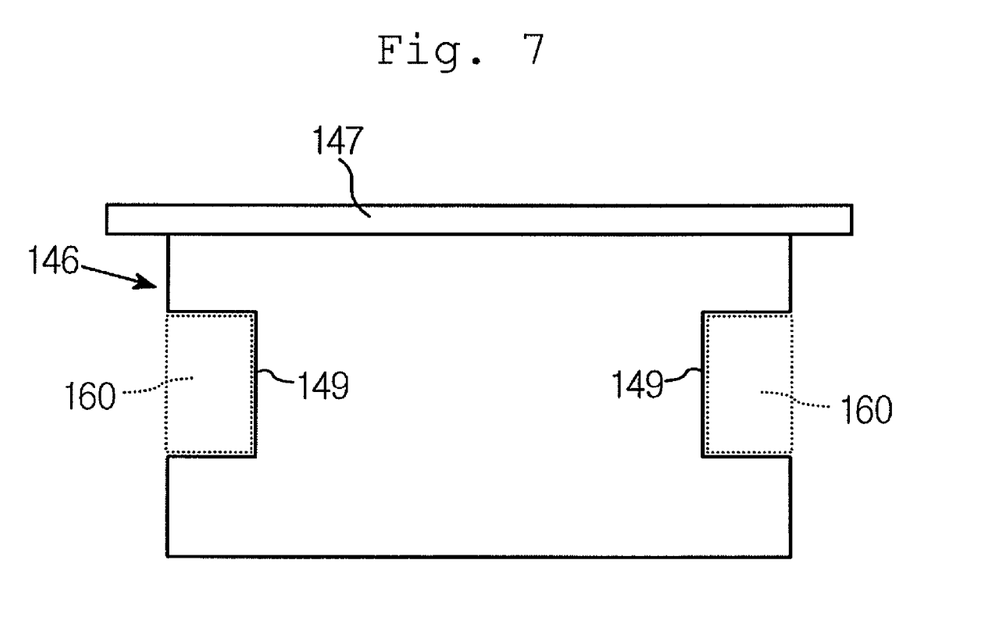
FIG. 7 is a front view showing a third preferred embodiment of the door and the bypass passageway of the rear air conditioner according to the present invention

For example, as shown in FIGS. 2 to 5, stepped-type interference preventing parts 149 may be formed on both free ends of the vent door 146, namely, both free ends of the door plate 148, and the passageway forming parts 160 may be respectively mounted in the rotating areas of the interference preventing parts 149. Moreover, as shown in FIG. 7, the groove-shaped interference preventing parts 149 may be formed at the centers of both ends of the vent door 146, and the passageway members 160 may be respectively formed in the rotating areas of the interference preventing parts 149.

Figure 5:
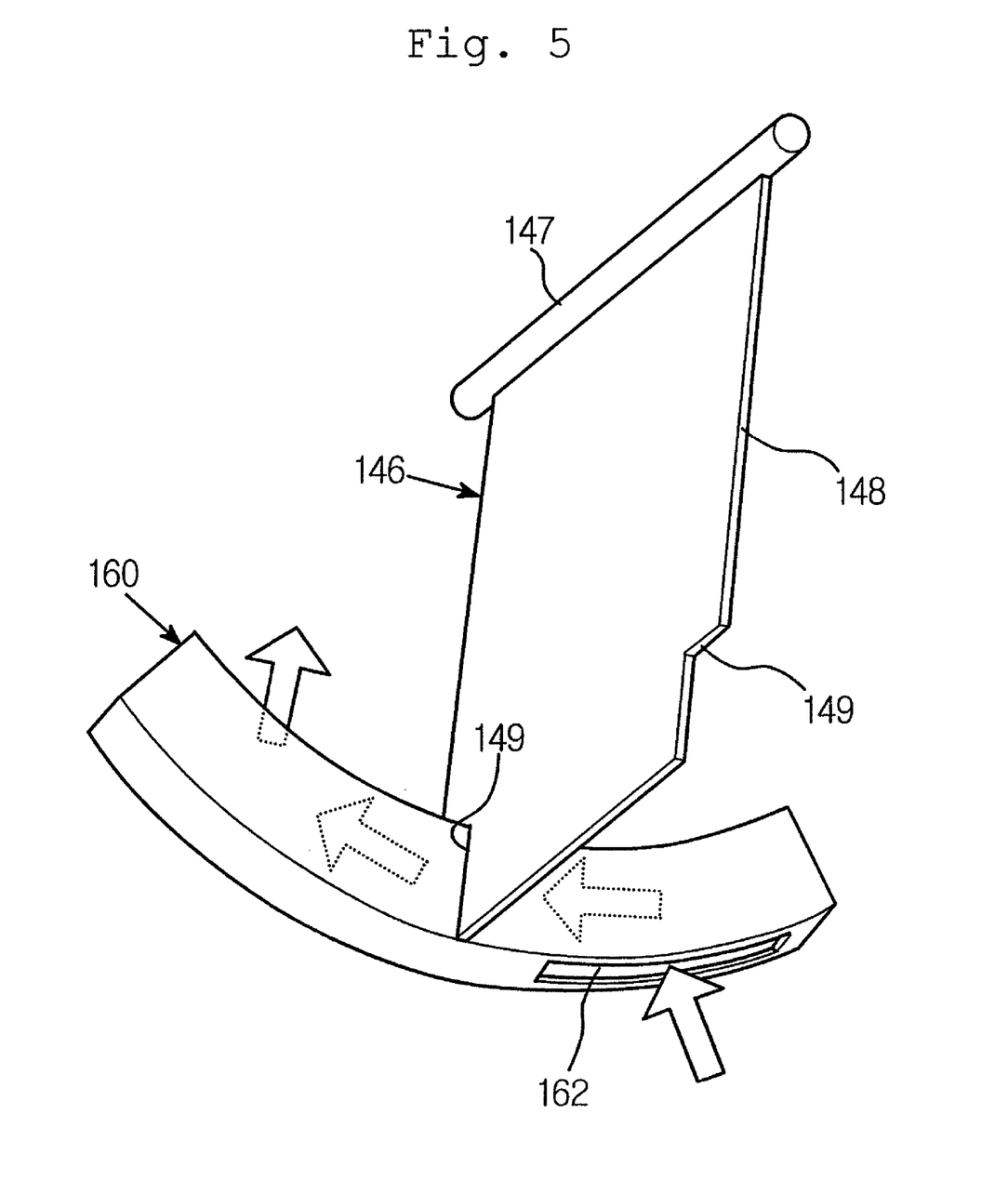
FIG. 5 is a perspective view showing a first preferred embodiment of the door and the bypass passageway of the rear air conditioner according to the present invention.

In FIGS. 3 to 5 showing the case where two passageway members 160 are mounted, for convenience, one passageway member 160 is shown, and so, you must understand that the other passageway member 160 is mounted on the other interference preventing part 149.

Meanwhile, the passageway member 160 may have one of various sectional structures, but if it has a rectangular section, the interference preventing part 149 is also formed in a rectangular shape. In this case, it is preferable that the passageway member 160 has a height of about 20 mm and a width of about 30 mm.

Furthermore, the inlet 162 and the outlet 164 of the passageway member 160 are designed in such a way as to have a size as good as they can properly control temperature of the right and left of the air conditioning case 140.

Moreover, it is preferable that the bypass passageway can fluidically intercommunicate an area of the face vent 142 and an area of the floor vent 144 in such a way as to bypass air of one area to the other area.

Next, the operation of the rear air conditioner for the vehicle having the above configuration will be described.

When the centrifugal fan 104 is rotated, air is inhaled in an axial direction of the centrifugal fan 104 through the air inlet (not shown) of the blower 100, discharged in the radius direction of the centrifugal fan 104, and then, induced into the air conditioning case 140.

For example, when the bi-level mode is operated, the temperature control door 150 is turned to the neutral position, and so, the cold air passageway (P1) and the hot air passageway (P2) are all opened. At the same time, the vent door 146 is also turned to the neutral position, and so, the face vent 142 and the floor vent 144 are all opened.

Therefore, the air induced into the air conditioning case 140 is cooled while passing through the evaporator 120, and at this time, a part of the air flows toward the mixing zone (MZ) through the cold air passageway (P1), and the remaining cold air is heated by the heater core 130 while passing through the hot air passageway (P2), and then, flows toward the mixing area (MZ). The cold air and the hot air are mixed in the mixing zone (MZ), and then, flow to the face vent 142 and the floor vent 144, but at this time, a part of the air remaining in the mixing zone (MZ) is discharged to the floor vent 144 after making a detour through the bypass passageway.

Temperature of the air flowing from the mixing zone (MZ) to the floor vent 144 is relatively higher since the floor vent 144 is located near to the hot air passageway (P2). However, the air of low temperature is induced into a flow channel of the passageway member 160 through the inlet 162 of the passageway member 160 located near to the cold air passageway (P1), flows toward the floor vent 144 through the outlet 164 of the passageway member 160, and then is mixed with the air of relatively higher temperature in the area of the floor vent 144, so that the air mixing efficiency is improved. That is, since the area of the floor vent 144 can be used as additional air mixing zone, the air conditioning case 140 can have a compact size without increasing the volume of the mixing zone (MZ) or reducing the size of the vent door 146.

Such air mixing action can be fulfilled also in the air discharge mode where only the face vent 142 is opened or in the air discharge mode where only the floor vent 144 is opened, and so, its detailed description will be omitted.

In this embodiment, the vent door 146 of a plate type is described, but, if the vent door 146 of a cylindrical type is applied, the interference preventing part in which the passageway member 160 is inserted can be formed on the outer periphery of the cylindrical door.

In any cases, a gap of a predetermined size may be formed between the interference preventing part 149 and the passageway member 160 in order to prevent interference when the vent door 146 is rotated, and a sealing member may be mounted on one of the interference preventing part 149 and the passageway member 160 in order to enhance sealability. The above configuration is also contained in the scope of the present invention.

As described above, according to the present invention, the rear air conditioner of the vehicle can improve the air mixing efficiency of cold air and hot air, and enhance air conditioning performance since the area of the floor vent 144 can be used as additional air mixing zone by the bypass passageway for bypassing a part of the air remaining in the mixing zone (MZ) toward the floor vent 144.

Furthermore, the present invention can improve the air mixing efficiency without increasing the volume of the mixing zone (MZ) or reducing the size of the vent door 146.

Additionally, the rear air conditioner according to the present invention can be designed in a compact size since it is not necessary to increase the size of the air conditioning case 140 due to the bypass passageway located in the rotating area of the vent door 146.

In addition, the present invention can easily control temperature of the air discharged to the face vent 142 and the floor vent 144.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A rear air conditioner for a vehicle comprising:
an air conditioning case connected with a blower and having a face vent and a floor vent formed and a vent door for controlling opening and closing of the face vent and the floor vent;
an evaporator and a heater core embedded in the air conditioning case;
a temperature control door for controlling opening and closing of a cold air passageway and a hot air passageway of the air conditioning case, and at least one passageway member formed in a rotating area covered by the vent door in order to discharge part of air, which flows through the cold air passageway or the hot air passageway, toward one of the vents, wherein each passageway member has an inlet for inducing the part of air flowing through the cold air passageway or the hot air passageway and an outlet for discharging the part of air induced toward one of the vents, and wherein the vent door includes one or more interference preventing parts respectively formed in correspondence with the passageway member to allow the vent door to slide along the outer periphery of the passageway member and the passageway member is respectively formed in at least one rotational trace of the interference preventing parts.

2. The rear air conditioner for a vehicle according to claim 1, wherein the inlet is formed adjacent to the cold air passageway, and the outlet is formed adjacent to the floor vent.

3. The rear air conditioner for a vehicle according to claim 1, wherein the passageway member has the same curvature as a rotational trace of the vent door.

4. The rear air conditioner for a vehicle according to claim 1, wherein the interference preventing parts are formed at a free end of the vent door.

5. The rear air conditioner for a vehicle according to claim 1, wherein the passageway member is arranged to fluidly connect an area of the face vent and an area of the floor vent partitioned by the vent door to discharge air of the area of the face vent to the floor vent or air of the area of the floor vent to the face vent.

6. A rear air conditioner for a vehicle comprising:
an air conditioning case connectable with a blower and comprising:
a face vent formed at an outlet of said case;
a floor vent formed at another outlet of said case; and
a vent door connected with said case and arranged to control opening and closing of the face vent and the floor vent;
an evaporator and a heater core positioned at least partially within said case; and
a temperature control door connected with said case and arranged to control opening and closing of a cold air passageway and a hot air passageway of said case;
at least one passageway member formed in an area swept over by rotation of the vent door, the passageway member having an inlet for guiding a portion of air flowing through the cold air passageway or the hot air passageway and an outlet for discharging the guided portion of air toward at least one of the face vent or the foot vent,
wherein the vent door has one or more interference preventing parts corresponding to the at least one passageway member to allow the vent door to slide along the outer periphery of the passageway member.

* * * * *